United States Patent
Park

Patent Number: 5,746,297
Date of Patent: May 5, 1998

[54] DEVICE FOR PREVENTING REVERSE ROTATION OF ROTOR IN SPINNING REELS

[75] Inventor: Bo Kug Park, Pusan, Rep. of Korea

[73] Assignee: Silver Star Co. Ltd.

[21] Appl. No.: 672,170

[22] Filed: Jun. 27, 1996

[30] Foreign Application Priority Data

Jul. 9, 1995 [KR] Rep. of Korea .......... 1995-24405

[51] Int. Cl.[6] .................................................. A01K 89/02
[52] U.S. Cl. .................................. 192/7; 188/82.4; 242/247
[58] Field of Search .......................... 192/7, 8 R; 74/576; 188/82.3, 82.4, 82.7; 242/247, 299, 300

[56] References Cited

U.S. PATENT DOCUMENTS

| | | |
|---|---|---|
| 5,221,057 | 6/1993 | Yoshikawa .......... 242/247 |
| 5,318,243 | 6/1994 | Hitomi et al. .......... 74/576 X |
| 5,338,111 | 8/1994 | Hitomi .......... 242/247 X |
| 5,388,777 | 2/1995 | Sugahara .......... 242/247 |
| 5,458,297 | 10/1995 | Shinohara et al. .......... 242/300 X |
| 5,485,903 | 1/1996 | Saito et al. .......... 192/7 X |

*Primary Examiner*—Richard M. Lorence
*Attorney, Agent, or Firm*—Richard T. Holzmann

[57] ABSTRACT

A device for preventing reverse rotation of a rotor in spinning reels is disclosed. In the device, an operational control shaft is fitted over a connection shaft and biased by a plate spring generating an elastic force. The operational control shaft has two connecting arms extending in different directions. The connecting arms are movably coupled to longitudinal holes of a reverse rotation prevention claw pivoted to a reel body, thereby coupling the operational control shaft to the claw at two coupling points. The turning force of the operational control shaft is thus precisely transmitted to the claw, thereby precisely performing the reverse rotation prevention operation. In this device both the connection shaft and the operational control shaft can smoothly rotate as they are supported by the plate spring.

4 Claims, 2 Drawing Sheets

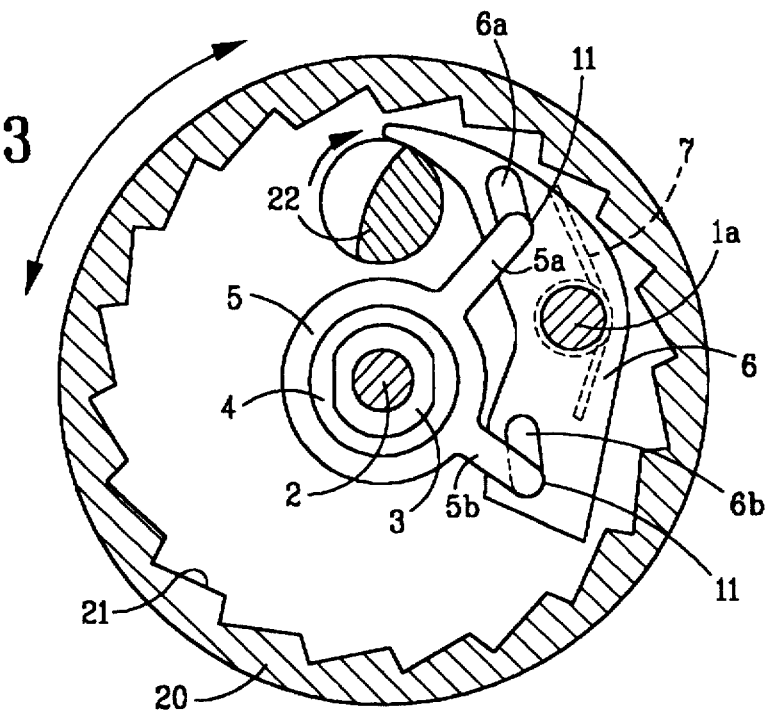
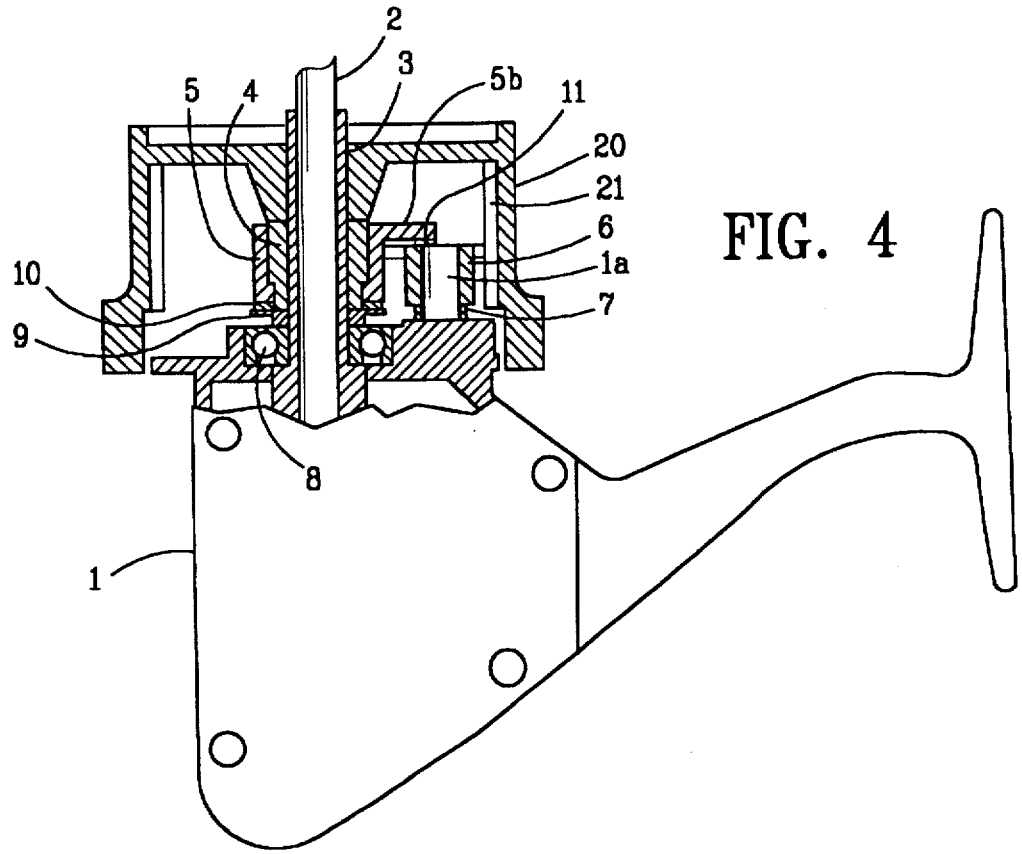

DEVICE FOR PREVENTING REVERSE ROTATION OF ROTOR IN SPINNING REELS

FIELD OF THE INVENTION

The present invention relates in general to a device for preventing reverse rotation of a rotor in spinning reels and, more particularly, to a structural improvement for precisely transmitting the turning force of an operational control shaft to a reverse rotation prevention claw, thereby precisely performing the reverse rotation prevention operation.

BACKGROUND OF THE INVENTION

In order to prevent reverse rotation of a rotor in a typical spinning reel, a reverse rotation prevention device is included in the spinning reel. In a conventional device, a connection shaft and an operational control shaft is fitted over a spool shaft. The spool shaft extends from a reel body to project out of the reel body. This operational control shaft is coupled to a reverse rotation prevention claw by means of one connecting member. This claw is pivoted to the reel body. A coil spring is fitted over the connection shaft. One end of the coil spring is fixed to the operational control shaft to bias the control shaft. The claw which is pivoted to the reel body rotates to selectively engage a ratchet gear of the rotor by the turning motion of the operating control shaft thereby preventing the rotor from reversely rotating. However, this device has the following problems.

As the operational control shaft is coupled to the claw by means of one connecting member only, a gap is generated in the connecting portion between the operational control shaft and the claw. Due to this gap, the turning motion of the claw for preventing reverse rotation of the rotor is not stable, thereby often failing to precisely operate. The coil spring is fitted over the connection shaft for providing a predetermined resistance on both the connection shaft and the operational control shaft. However, when the diameter of the coil spring is larger than the outer diameter of the connection shaft, the operational control shaft idles. Meanwhile, when the diameter of the coil spring is smaller than the outer diameter of the connection shaft, a resistance is generated in the operational control shaft when the shaft rotates thereby disturbing the rotating motion of the operational control shaft.

SUMMARY OF THE INVENTION

It is, therefore, an object of the present invention to provide a device for preventing reverse rotation of a rotor in which the above problems can be overcome. In the instant device, an operational control shaft fitted over a connection shaft is biased by a plate spring and movably coupled to the claw. The operational control shaft has two connecting arms extending in different directions. These connecting arms are movably coupled to longitudinal holes of a reverse rotation prevention claw pivoted to a reel body, thereby coupling the operational control shaft to the claw at two points. The turning force of the operational control shaft is thus precisely transmitted to the claw, thereby precisely performing the reverse rotation prevention operation. In this device, both the connection shaft and the operational control shaft can smoothly rotate as they are supported by the plate spring.

BRIEF DESCRIPTION OF THE DRAWINGS

The above and other objects, features and advantages of the present invention will be more clearly understood from the following detailed description taken in conjunction with the accompanying drawings, in which:

FIG. 3 is a plan view of the above device showing the claw separated from the ratchet gear by the turning motion of a cam; and FIG. 4 is a sectional view showing the construction of the above device.

DESCRIPTION OF THE PREFERRED EMBODIMENTS

Figure 1:
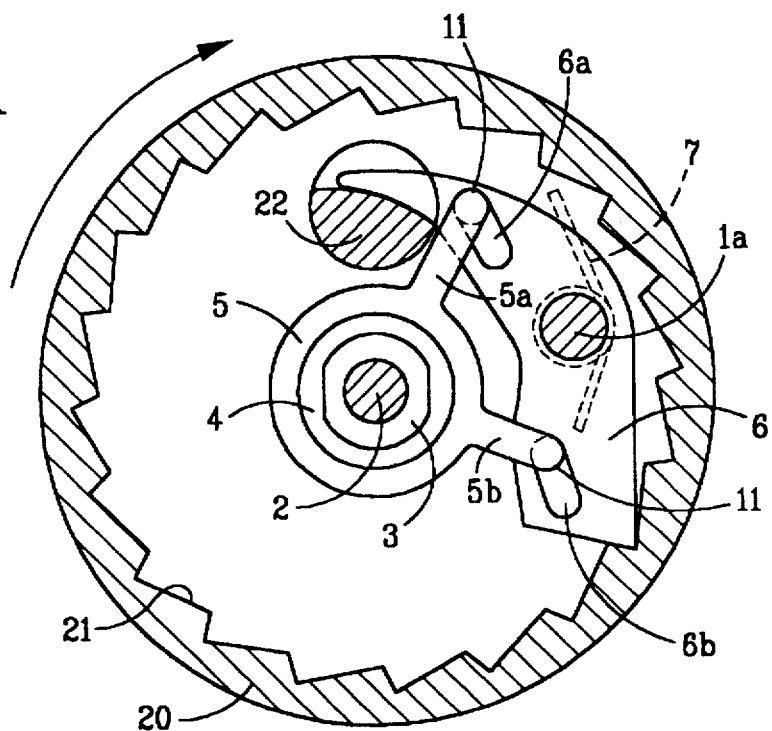
FIG. 1 is a plan view of a device for preventing the reverse rotation of a rotor in a spinning reel in accordance with an embodiment of the present invention, showing a claw engaging with a ratchet gear of the rotor to prevent the rotor from reversely rotating.
Figure 2:
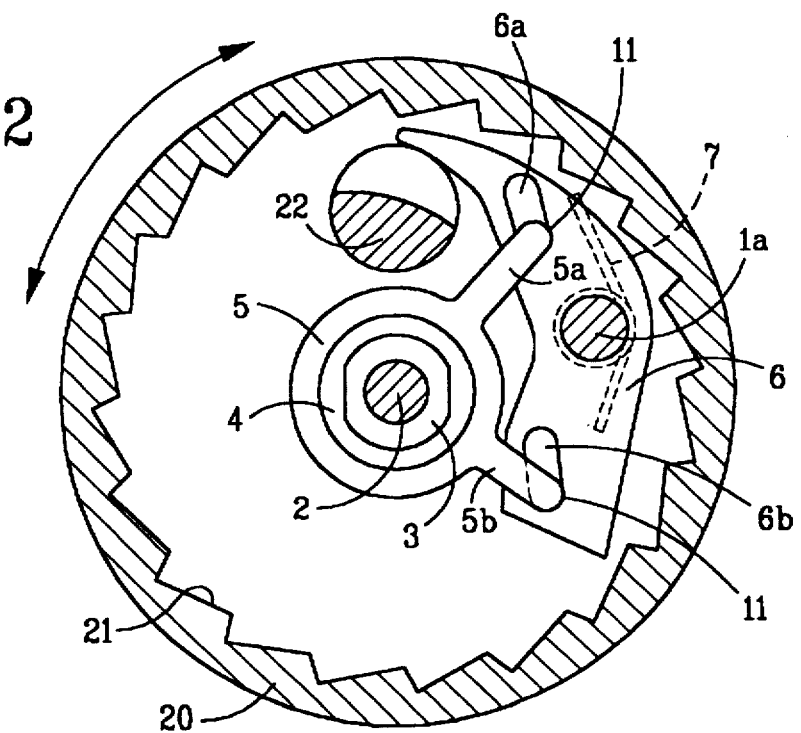
FIG. 2 is a plan view of the above device, showing the claw separated from the ratchet gear to release the rotor.

FIGS. 1 to 4 show a device for preventing the reverse rotation of a rotor in a spinning reel in accordance with a preferred embodiment of the present invention. FIG. 1 shows the device in a reverse rotation prevention position. FIGS. 2 and 3 show the device in a released position. FIG. 4 is a sectional view showing the construction of the device. As shown in the drawings, the device includes a pinion shaft 3 which is fitted over a spool shaft 2. The spool shaft 2 extends from a reel body 1 to project out of the body 1. The device also includes a connection shaft 4 fitted over the pinion shaft 3. An operational control shaft 5 is fitted over the connection shaft 4. A hinge shaft 1a is fixed to the reel body 1. The hinge shaft 1a pivots a reverse rotation prevention claw 6 to the reel body 1. Claw 6 is biased by a torsion spring 7. The spring-biased claw 6 in turn is coupled to the operational control shaft 5.

The position of the pinion shaft 3 relative to reel body 1 is held by bearing 8. Bearing 8 also supports a plate spring seat 9 which holds a plate spring 10. Plate spring 10 is fitted over connection shaft 4 between the operational control shaft 5 and the spring seat 9 thereby supporting both connection shaft 4 and operational control shaft 5. Plate spring 10 has the configuration a bent washer. Its function is achieved by the elastic force occurring at the bent point when its central portion is slightly bent. The pinion shaft 3 supported in the reel body 1 by the bearing 8 is inserted to the outside so that the plate spring seat 9 is placed on top of bearing 8. The plate spring 10 is placed on the top of plate spring seat 9. Then, the operational control shaft 5, connection shaft 4 and rotor 20 are inserted and combined with the plate spring 10. The operational control shaft 5 is held by the elastic force of the plate spring 10 placed on the plate spring seat 9. Operational control shaft 5 is provided with a pair of connecting arms 5a and 5b. Arms 5a and 5b extend from shaft 5 in different directions. In order to couple operational control shaft 5 to reverse rotation prevention claw 6, claw 6 has a pair of longitudinal holes 6a and 6b. Connecting arms 5a and 5b of shaft 5 have pins 11 which are movably received in longitudinal holes 6a and 6b of claw 6 respectively. Pins 11 of connecting arms 5a and 5b couple the operational control shaft 5 to claw 6 at two points.

In the drawings, reference numeral 20 denotes the rotor, numeral 21 denotes a ratchet gear formed in the internal surface of rotor 20. Numeral 22 denotes a cam selectively operating claw 6.

The operational effect of the reverse rotation prevention device is described hereinbelow. When a reverse rotational force is generated in the pinion shaft 3 of reel body 1 while fishing, rotor 20 coupled to pinion shaft 3, a reverse rotation force is applied thereby inducing rotation in a reverse direction. This reverse rotation force of the pinion shaft 3 acts in a direction opposite to the fishline winding direction. In this state, a reverse rotation force is applied to both connecting shaft 4 and operational control shaft 5 fitted over pinion shaft 3.

When the reverse rotating force of pinion shaft 3 is applied to the operational control shaft 5 as described above, shaft 5 rotates in a reverse direction thereby changing positions of connecting arms 5a and 5b. Pins 11 of these connecting arms 5a and 5b thus move in the longitudinal holes 6a and 6b of claw 6, thereby starting the motion for prevention of reverse rotation of rotor 20.

That is, the first hole 6a of claw 6 coupled to the first connecting arm 5a of shaft 5 is subjected to a pulling force, while the second hole 6b of claw 6 coupled to the second arm 5b of shaft 5 is subjected to a pushing force. Therefore, claw 6 rotates about hinge shaft 1a counterclockwise (from the viewpoint of the drawings), thereby causing its ratchet tip to engage ratchet gear 21 of rotor 20 as shown in FIG. 1 and preventing rotor 20 from rotating in the reverse direction.

When rotor 20 in the above state further rotates in the forward direction, pinion shaft 3 also rotates in the forward direction. Consequently, rotor 20, connection shaft 4 and operational control shaft 5 all rotate in the forward direction. Operational control shaft 5 thus moves to its forward rotating position, thereby applying a pushing force to the first hole 6a of claw 6 through its first connecting arm 5a while applying a pulling force to the second hole 6b through its second arm 5b. The reverse rotation prevention claw 6 in the above state thus rotates about hinge shaft 1a in a clockwise direction from the viewpoint of the drawings, thereby separating its ratchet tip from ratchet gear 21 of rotor 20 as shown in FIG. 2 and allowing rotor 20 to rotate in the forward direction.

In the above operation, plate spring 10 which is fitted over connection shaft 4 between operational control shaft 5 and spring seat 9 and is slightly bent is elastically deformed at its bent point thus causing claw 6 to precisely perform the above motion.

In order to release the reverse rotation prevention function of the device which would allow rotor 20 to freely rotate in either the forward or reverse direction, cam 22 rotates to push the rear end of claw 6 outward thereby rotating claw 6 about shaft 1a of reel body 1. The ratchet tip of claw 6 is thus separated from ratchet gear 21 of rotor 20 as shown in FIG. 3. Rotor 20 in the above state can rotate in either the forward or reverse direction.

As described above, the present invention provides a structurally improved device for preventing reverse rotation in a spinning reel. In this device, a pinion shaft is fitted over a spool shaft which extends from a reel body to project out of the body. Both a connection shaft and an operational control shaft are fitted over the pinion shaft. A plate spring is fitted over the connection shaft between a spring seat and the operational control shaft in order to generate an elastic force. A pair of connecting arms of the operational control shaft is movably coupled to a pair of longitudinal holes of a reverse rotation prevention claw pivoted to the reel body. The above claw is selectively brought into engagement with a ratchet gear of the rotor by a rotating motion of the operational control shaft, thus precisely and effectively preventing the reverse rotation of the rotor in the spinning reel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An improved device for preventing reverse rotation of a rotor in spinning reels of the type including a pinion shaft fitted over a spool shaft which extends from a reel body, a connection shaft fitted over said pinion shaft, an operational control shaft fitted over said connection shaft and a reverse rotation prevention claw coupled to said operational control shaft, wherein the improvement comprises:

a pair of connecting arms extending from said operational control shaft in different directions, said arms having pins movably received in said reverse rotation prevention claw having longitudinal holes therein, for coupling said operational control shaft to said reverse rotation prevention claw at two coupling points; and a plate spring generating an elastic force fitted over said connection shaft between a spring seat and said operational control shaft, said control shaft movably coupled to said claw, for supporting said connection shaft and said operational control shaft, said spring seat being fitted over said pinion shaft and held by a pinion shaft bearing for biasing said control shaft.

2. The device in accordance with claim 1 further comprising a hinge shaft fixed to a reel body coupled with a torsion spring for biasing said reverse rotation prevention claw as it rotates about the hinge shaft.

3. The device in accordance with claim 1 wherein the rotor has formed within the inner surface thereof a ratchet gear said ratchet gear for engaging and disengaging said reverse rotation prevention claw for preventing and promoting reverse rotation of the rotor.

4. The device in accordance with claim 1 further comprising a cam for selectively operating said reverse rotation prevention claw for engaging and disengaging said ratchet gear by the turning motion of the cam.

* * * * *